United States Patent

[11] 3,584,224

[72] Inventor George S. Harlem
Acton, Mass.
[21] Appl. No. 793,475
[22] Filed Jan. 23, 1969
[45] Patented June 8, 1971
[73] Assignee Itek Corporation
Lexington, Mass.

[54] FRAME DETECTION SYSTEM
7 Claims, 1 Drawing Fig.

[52] U.S. Cl. .......... 250/219, 178/7.83, 250/209, 250/220
[51] Int. Cl. .......... G01n 21/30, H01j 29/34
[50] Field of Search .......... 250/208, 209, 219, 219 F, 219 W, 219 RG, 220, 223; 178/6, 7.6, 7.83

[56] References Cited
UNITED STATES PATENTS

| | | | |
|---|---|---|---|
| 2,408,029 | 9/1946 | Bazzoni et al. | 250/219 X |
| 2,653,508 | 9/1953 | Whiteley | 250/219 X |
| 3,299,272 | 1/1967 | Furukawa et al. | 250/209 X |
| 3,399,306 | 8/1968 | Guastavine | 250/219 |
| 3,439,176 | 4/1969 | Astley et al. | 250/219 |
| 3,469,480 | 9/1969 | Nassenstein et al. | 250/219 X |

*Primary Examiner*—Roy Lake
*Assistant Examiner*—E. R. La Roche
*Attorneys*—Homer O. Blair, Robert L. Nathans and William C. Roch

ABSTRACT: Apparatus for detecting a fiducial mark or interframe space of a film strip. The apparatus consists of a plurality of photosensitive elements which are disposed across the width of the film strip. The signals from the photosensitive elements are analyzed in a logic circuit which subtracts each signal from each other signal. If a zero signal is produced as a result of the subtractions, the logic circuit indicates that an interframe space has been sensed.

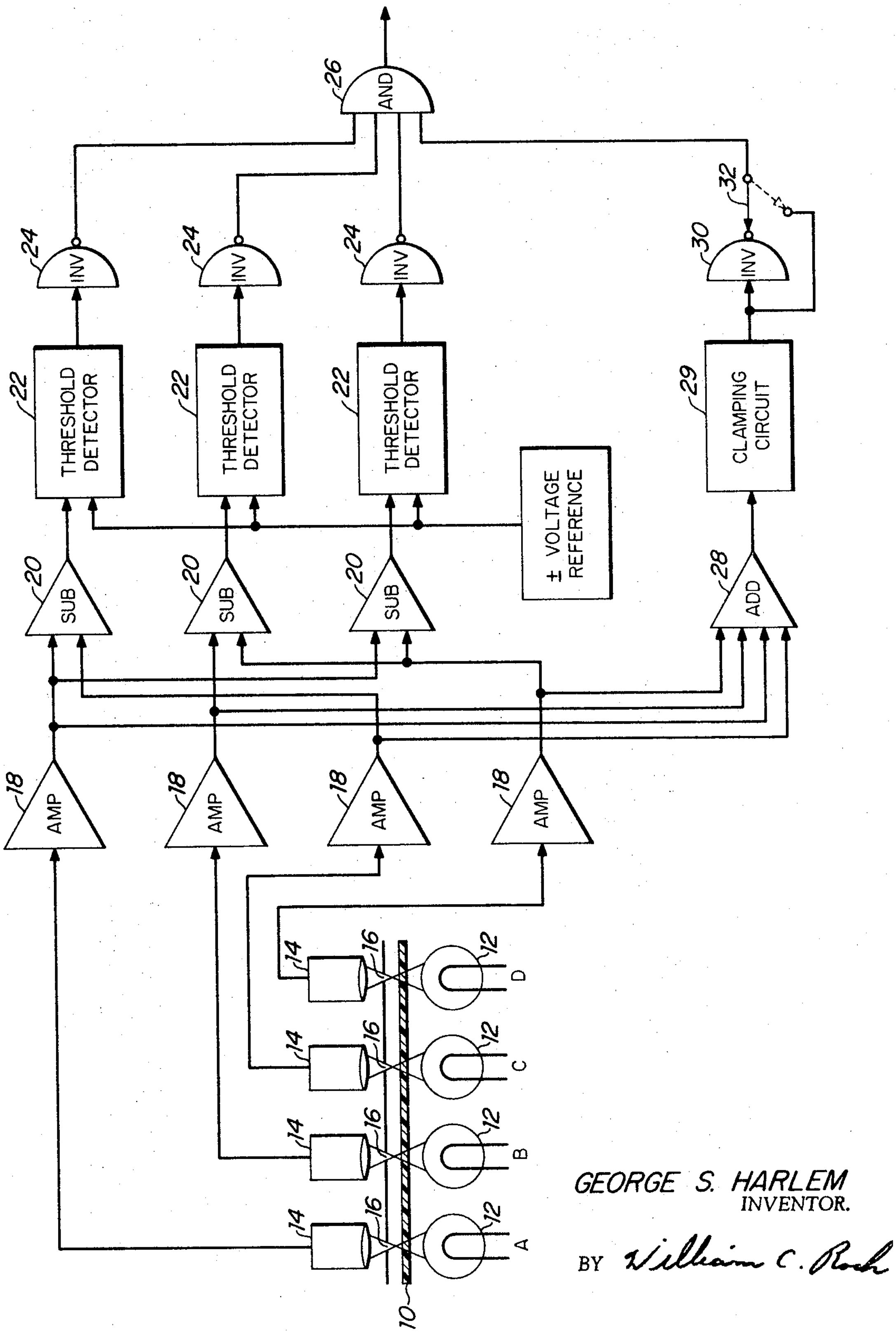
GEORGE S. HARLEM
INVENTOR.
BY William C. Roch
AGENT.

FRAME DETECTION SYSTEM

BACKGROUND OF THE INVENTION

1. Field of the Invention

The invention is related to the field of detecting fiducial marks on a web and more particularly to identifying interframe spaces on a film strip.

2. Description of the Prior Art

Many devices are known in the prior art which employ a source for projecting light across a web with photodetection apparatus positioned to receive light reflected or transmitted by the web. The photodetection apparatus responds to variations in the light reflected or transmitted by the web, and these variations are analyzed for the desired information. For example, in character recognition devices a row of phototubes is placed perpendicular to the direction of motion of a moving web and in a position to receive light projected through the web. Characters imprinted on the web interrupt the projected light and cause the outputs of the photodetectors to fluctuate in a manner defined by the shape of the character. The fluctuating signals are then compared with a memory and the character identified when correspondence is achieved.

Other devices are known for detecting flaws such as streaks or spots on moving webs by examining light reflected from or transmitted by the web with photodetectors to sense changes in light levels caused by blocking or scattering of the impinging light when the flaw is in the light field.

Still other devices are known in which fiducial marks located at the edge of the web for determining frame position are detected by a photocell and logic which is set to respond to a simple interruption of a light signal by the mark.

Sensing a mark or space which occupies a position in the same transverse portion of the web as information which has been placed on the web creates problems which are not easily solved by adaptation of the above-mentioned devices. Specifically, a film interframe space, whether it be clear or opaque, extends across the width of the web such that a set of photodetectors positioned transversely across the web may detect reflected or transmitted light which is modulated by the information on the web as well as the interframe space. Thus, automatic detection of an interframe space which defines the extent of a frame on a web requires means to differentiate between the space and other information which may be so similar as to cause spurious results.

SUMMARY OF THE INVENTION

In accordance with one aspect of the invention, a detection system is provided in which at least two photodetectors are positioned to intercept transmitted or reflected light which is modulated by the presence of a mark or interframe space. The detectors and light source are adjusted to yield identical outputs when the subject mark or interframe space covers the detector fields. By proper positioning with respect to the known orientation of the mark, the detectors will simultaneously provide at least one pair of identical signals which may be subtracted or otherwise compared to indicate the presence of the mark.

In accordance with another aspect of the invention, at least three photodetectors are used in the manner described above and three subtractions are performed. Additional circuitry is provided to add the output of each detector and to utilize the summation as a further determinent of the occurrence of a mark or space.

The output of the detection system may be used for film metering, frame counting, frame identification or other control functions.

The disclosed invention is particularly useful for determining the boundaries of a frame on a film strip where the extent of each frame varies in an unknown manner, a situation which often occurs, for example, in aerial photography. The invention is also fully compatible with standard film strips as no special fiducial marks are required on the film strip for recognition. Because no special fiducial marks are required, the invention is fully operable with film strips already taken. However, the invention is equally suitable for the detection of special fiducial marks which may be spaced on a film or web.

The foregoing objects and advantages of the present invention will become more fully apparent from the following detailed description of the exemplifying embodying apparatus shown in the accompanying drawing.

BRIEF DESCRIPTION OF THE DRAWING

The FIGURE shows a schematic illustration of one embodiment of the present invention.

DESCRIPTION OF THE PREFERRED EMBODIMENT

Referring to the FIGURE, there is shown a diagrammatic representation of the invention comprising four photodetector assemblies and associated logic circuitry for detecting the presence of an interframe space on a strip of film.

Film strip 10 moving in or out of the paper and driven by means not illustrated is shown in cross section. Light sources 12 illuminate the strip and the light modulated by the changing density of the information on the strip is detected by photodetectors 14 after passing through aperture slits 16.

The output signal of each detector is fed to an amplifier 18 which is adjusted to provide an identical output level for a corresponding light flux input to each of the photodetectors. Further, the output of each amplifier is adjusted to zero for zero input light flux.

Each amplified signal is subtracted by subtractors 20 from at least one other signal to provide a comparison of the signal levels and thus the density of the area on the film strip being scanned by the photodetector array. As shown, channels A, B, C, and D are subtracted as follows: A minus C, B minus D and A minus D. It will be understood that other combinations could alternatively be used with similar results and that more comparisons could be made at the option of the user as long as each channel is compared with at least one other channel. Also, it should be realized that the comparisons could be made by other than subtracting circuits. For instance, amplitude gating could be utilized in which the outputs of the amplitude gating circuits are subsequently analyzed by some form of digital circuitry such as alternative AND gates.

The result of each subtraction or comparison is analyzed by a differential threshold detector 22. Each threshold detector is provided with a plus and minus reference voltage to establish a window about zero volts, which window is adjustable to compensate for system noise, drift, and similar factors which are present in electronic systems. Each threshold detector will produce a logical zero output signal when its input signal falls within the window around zero, and a logical one output signal when the input signals fall without the window. Each threshold detector may, if desired, utilize a hysteresis effect for more positive switching.

The logical zero is then inverted to a logical one by inverters 24 and fed to an AND gage 26, which as is known in the art will provide a logical one output only when all inputs are logical ones.

In a further aspect of the invention in which the interframe space or mark is dense rather than clear, an additional piece of information may be utilized to enhance the accuracy of the system. When the system is sensing a dense interframe space, the outputs from the photosensitive detectors should be near zero. As a verification of this fact amplifier 28 sums the amplified outputs of the detectors from the four amplifiers 18. The summed output of amplifier 28 is clamped by circuit 29 to keep it to logic levels and then inverted by inverter 30, from whence it is sent as a fourth input to the output AND gate 26. If the sum of the four photodetector signals falls within a narrow region about zero, a logical one signal will be generated by inverter 30 and fed to AND gate 26 as an indication that each photodetector has received substantially zero light flux and that coincidence among four highly dense areas has been achieved; i.e., a mark or interframe space has been identified.

Where the space is clear and high levels of light are to be expected at each detector, the sum of the signals from amplifier 28 will in itself satisfy the input requirements of AND gate 26 and the inverter is therefore bypassed with switch 32.

An alternative embodiment is available which is not illustrated in the drawing but which could be utilized to detect interframe marks in certain situations. If the expected output of each photosensitive detector were known for an interframe mark, the output signal could be fed directly to a threshold detecting circuit and the outputs for the threshold detecting circuits could be analyzed via an AND gate in much the same manner as is illustrated in the preferred embodiment. Alternatively, the outputs from all the detectors could be added, and the sum compared with a reference signal which would represent the anticipated result. However, it should be realized that this type of circuitry could only be used wherein the expected output of the photosensitive detectors is known for the type of film being analyzed, and that a different type of film, either with the opposite interframe density or with a slightly different interframe density would require a different setting for the threshold detection circuitry. The advantage of the preferred embodiment lies in its ability to be used generically for all types of film regardless of the interframe density. Except for switch 32, the preferred embodiment will analyze all types of film with no required change in the circuitry.

As an illustration of how the invention operates, suppose a dense interframe film were being analyzed, and that the film frame being sensed shows a lake in the midst of a dense forest. Further, photosensitive detector channels A, C and D sense the forest which is very dark on the film frame, while channel B senses the lake which is very light on the film frame. Referring to the circuit shown in the drawing, the top subtracting circuit 20 compares signals from channels A and C, which would result in a logical one being sent to AND gate 26 since channels A and C both sense the dark forest. The middle subtracting circuit compares channels B and D, and this comparison would result in a logical zero being fed to AND gate 26 since channel B senses the light lake while channel D senses the dark forest; the large difference signal fed to threshold detector 22 would lie outside its reference window, and this would result in a logical zero being fed to AND gate 26. The bottom subtracting circuit 20 compares signals from channels A and D, which would result in a logical one being sent to AND gate 26 since channels A and D both sense the dark forest. Summing amplifier 28 should receive the strong output signal from channel B which senses the light lake, and this signal would be powerful enough to result in a logical one from clamping circuit 29, which when fed through inverter 30 would reach AND gate 26 as a logical zero. The logic circuit would not indicate that an interframe mark had been sensed, since the logical zero from the middle subtracting circuit and the logical zero emanating from the summing amplifier 28 would prevent AND gate 26 from giving a logical one output.

What I claim is:

1. Apparatus for detecting a fiducial mark on a moving web comprising in combination:

a. a light source for illuminating said web;
b. at least three photosensitive detectors, each having a field of view which covers a separate area of said web and each producing an output signal in response to modulation of the light by the moving web;
c. circuit means for subtracting the output signals of at least two photosensitive detectors from the output signals of at least two other photosensitive detectors; and
d. output circuit means for indicating the detection of a fiducial mark when the output of said subtracting circuit shows substantial equality of said subtracted detector output signals.

2. Apparatus as set forth in claim 1 wherein each detector is disposed substantially perpendicular to the direction of motion of the web, and said fields of view of said detectors are equally spaced transversely across the web.

3. Apparatus as set forth in claim 1 wherein said output circuit includes:

a. means for checking the result of each subtraction made by said subtraction circuit means for determining if each result lies between minimum and maximum references, and for yielding an output signal when a result lies between said minimum and maximum references; and
b. means, having as its input the output signals of said checking means, for yielding an output signal upon the simultaneous receipt of output signals from said checking means for all subtractions being checked.

4. Apparatus as set forth in claim 1 wherein said output circuit means includes:

a. threshold detector means for checking the result of each subtraction made by said subtraction circuit means for determining if each result lies between minimum and maximum references, said threshold detector means yielding a logical output signal of a first level when a result lies between said minimum and maximum references, and yielding a second polarity logical output signal of a second level when a result lies without the minimum and maximum references; and
b. an AND gate, having as its input the logical output signals of said threshold detector means, for yielding an output signal upon the simultaneous occurrence of all logical input signals of said first level.

5. Apparatus for detecting a fiducial mark on a moving web comprising in combination:

a. a light source for illuminating the web;
b. at least three photosensitive detectors, each having a field of view which covers a separate area of the web and each producing an output signal in response to modulation of the light by the moving web;
c. comparator circuit means for comparing the output signal of each detector with the output signal of at least one other detector; and
d. output circuit means for indicating the detection of a fiducial mark when the output of said comparator circuit shows substantial equality of said detector output signals, and including summing means which adds the output signals of all of said photosensitive detectors to determine if the sum is substantially zero, which indicates an interframe space is being sensed if the web being checked has dense interframe spaces.

6. Apparatus for detecting a fiducial mark on a moving web comprising in combination:

a. a light source for illuminating said web;
b. at least three photosensitive detectors, each having a field of view which covers a separate area of the web and each producing an output signal in response to modulation of the light by the moving web;
c. comparator circuit means for comparing the output signal of each detector with the output signal of at least one other detector; and
d. output circuit means for indicating the detection of a fiducial mark when the output of said comparator circuit shows substantial equality of said detector output signals, and including:
   i. threshold detector means for checking the result of each comparison with a minimum and a maximum reference to determine if said result lies between the minimum and maximum references, said threshold detector means yielding a logical zero output when each output of said comparator circuit means lies within said minimum and maximum references, and yielding a logical one output signal when each output of said comparator circuit means lies without the minimum and maximum references;
   ii. inverter means at the output of said threshold detector means for inverting each output of said threshold detector means to yield a logical one whenever an output of said threshold detector means is a logical zero; and
   iii. an AND gate, having as its input the outputs of said inverter means, for yielding an output signal upon the simultaneous occurrence of all logical one input signals from said inverter means.

7. Apparatus as set forth in claim 6 wherein said output circuit means further includes:

a. summing means which adds the outputs of all said photosensitive detectors to determine if the sum is substantially zero, which indicates an interframe space is being sensed if the web being checked has dense interframe spacing;

b. an inverter which accepts the output of said summing means and yields a logical one output whenever the output of said summing means is a logical zero;

c. said AND gate has an input from said inverter at the output of said summing means, and yields an output upon the simultaneous occurrence of all said logical one inputs.